W. IHNKEN.
TIRE CHAIN CLAMP.
APPLICATION FILED JAN. 16, 1918.
1,288,009.
Patented Dec. 17, 1918.
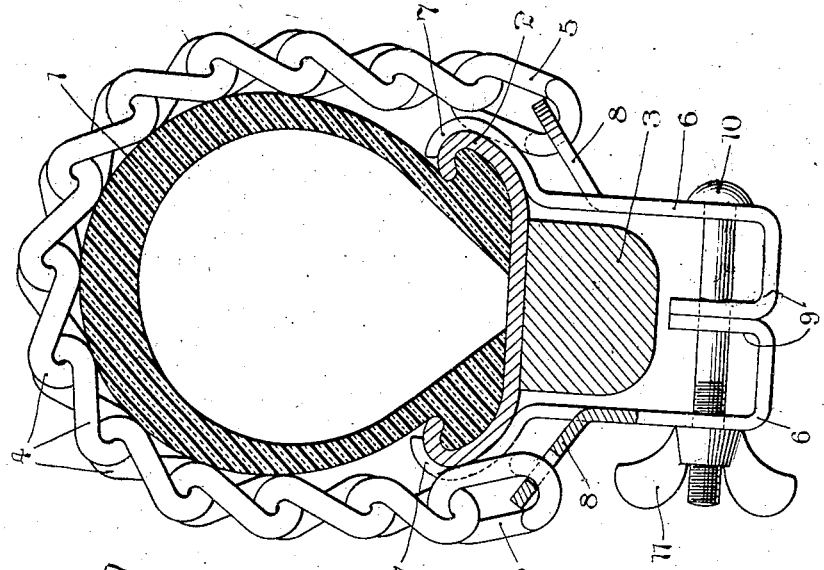
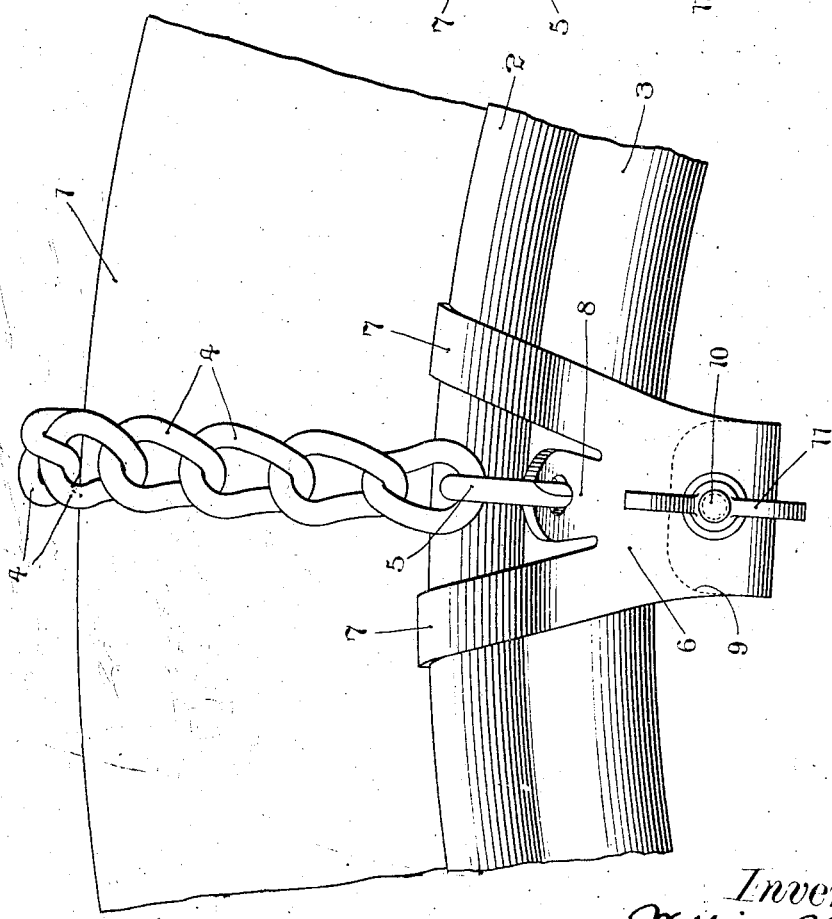
Inventor
William Ihnken
by his attorney

UNITED STATES PATENT OFFICE.

WILLIAM IHNKEN, OF BLOOMFIELD, NEW JERSEY.

TIRE-CHAIN CLAMP.

1,288,009. Specification of Letters Patent. Patented Dec. 17, 1918.

Application filed January 16, 1918. Serial No. 212,157.

*To all whom it may concern:*

Be it known that I, WILLIAM IHNKEN, a citizen of the United States, and resident of Bloomfield, in the county of Essex and State of New Jersey, have invented a new and useful Improvement in Tire-Chain Clamps, of which the following is a specification.

This invention relates to improvements in tire chain clamps, that is, devices which are designed to be secured to some part of the wheel for the purpose of holding non-skid cross chains in position upon the tire.

The object of the invention is to provide a device of this character which is very simple and cheap to manufacture; which may quickly and readily be secured, without the use of tools, in various positions on the circumference of the wheel; which does not, when in position, engage the felly or spokes of the wheel or require any disfigurement of the same in its application; and which is so light and sightly in appearance that it may, if desired, be left in position on the wheel even when the chains are not in use, or be conveniently stored in a very small place when removed.

Another object is to provide certain improvements in the form, construction and arrangement of the several parts whereby the above named and other advantages may be effectively attained.

A practical embodiment of my invention is represented in the accompanying drawings in which, Figure 1 represents a side elevation of the device in position on a tire, and Fig. 2 represents a transverse section of the same.

The tire is denoted by 1, its rim by 2, and the wheel felly, to which the rim may be secured in the ordinary manner, by 3. These parts are shown as of conventional form, and, as their particular structure constitutes no part of my invention, they will not be described in detail.

The non-skid cross chain is indicated by 4, and it is provided at each extremity with some attachable and detachable arrangement such as split links 5, for the purpose of removably securing it to the holding device or clamp.

The clamp consists of a pair of clips which are identical in form and structure. Hence, it will be sufficient to describe one of them, as it will be understood that the said description applies equally to both.

The clip 6 may be composed of suitable material, such as cast or stamped iron, and it has a body portion from which there project, in a flaring manner, a pair of claws 7. These claws are curved so as to have their extremities conform substantially to the outside contour of a tire rim, such as that shown at 2, which is of what is known as the standard clencher shape. It will be understood, however, that, in case a wheel is provided with rims having a different form from that shown, the shape of the claws 7 may be modified to conform therewith. I believe it will be found that the shape of claw shown in the drawings will be satisfactory in a great majority of cases.

Between the claws 7, there is a lug or anchorage 8, which projects laterally from the body of the clip 6, and is perforated for engagement with the split link 5 of the chain 4. The lateral extension of the anchorage facilitates the attachment of the chain thereto.

The extremity of the clip opposite the claws 7, which I may refer to as the inner part, is bent around into a U-formation, as clearly shown at 9 in Fig. 2. The size and shape of these parts are such that when the two clips are in position upon the wheel, the said parts 9 will abut and thereby hold the body portions of the clips in substantial parallelism and spaced from the felly of the wheel.

The main body of the clip, as well as the bent end 9, is provided with holes in order that a bolt 10 may traverse the same; which bolt is fitted with a wing nut 11 for securing the clips firmly together and in position on the wheel.

From the above description it will be seen that it is simply necessary to hold a pair of clips at opposite positions on the wheel, with their claws 7 in engagement with the tire rim 2, and then pass the bolt 10 through the clips and screw home the wing nut 11. This operation serves to very firmly lock the clips against the tire rim and against each other, and the slight spring of the metal prevents the nut 11 from loosening while the vehicle is traveling. With the clips in position, constituting the said clamp, the chain may be secured thereto by opening the split links 5, passing the same through the holes in the anchorage 8, and then closing the links, in an obvious manner.

It will be understood that various changes may be resorted to in the form, construction and arrangement of the several parts without departing from the spirit and scope of my invention, and hence I do not intend to be limited to the details herein shown and described except as they may be specifically set forth in the claims.

What I claim is:

1. A tire chain clamp comprising, a pair of clips having bent portions for engaging the tire rim, said clips also having inwardly extending portions, and means engaging the said inwardly extending portions for drawing the clips into close contact with the rim, said inwardly extending portions being formed so as to abut each other and thereby space the clips from the sides of the wheel felly.

2. A tire chain clamp comprising, a pair of clips, each clip having a pair of claws for engaging the tire rim, each clip also having an inwardly extending portion, and means for engaging the inwardly extending portions for drawing the clips into close contact with the rim, said inwardly extending portions being formed so as to abut each other and thereby space the clips from the sides of the wheel felly.

3. A tire chain clamp comprising, a pair of clips, each clip having a pair of claws for engaging the tire rim, each clip also having an inwardly extending portion, means engaging the inwardly extending portions for drawing the clips into close contact with the rim, and an anchorage for a chain located on each clip between the claws.

4. A tire chain clamp, comprising, a pair of clips, each clip having a pair of claws for engaging the tire rim, each clip also having an inwardly extending portion, means engaging the inwardly extending portions for drawing the clips into close contact with the rim, said inwardly extending portions being formed so as to abut each other and thereby space the clips from the sides of the wheel felly, and an anchorage for a chain located on each clip.

5. A tire chain clamp comprising, a pair of clips, each clip having a pair of claws for engaging the tire rim, each clip also having an inwardly extending portion, means engaging the inwardly extending portions for drawing the clips into close contact with the rim, and a laterally projecting anchorage for a chain located on each clip between the claws.

6. A tire chain clamp comprising, a pair of clips, each clip having a pair of claws for engaging the tire rim, each clip also having an inwardly extending portion, means engaging the inwardly extending portions for drawing the clips into close contact with the rim, said inwardly extending portions being formed so as to abut each other and thereby space the clips from the sides of the wheel felly, and a laterally projecting anchorage for a chain located on each clip.

In testimony, that I claim the foregoing as my invention I have signed my name this 14th day of January, 1918.

WILLIAM IHNKEN.